UNITED STATES PATENT OFFICE.

CHARLES V. MITTGE, OF BROOKLYN, NEW YORK.

WATER-PROOF COMPOSITION FOR FLOORS, WALLS, &c.

SPECIFICATION forming part of Letters Patent No. 385,471, dated July 3, 1888.

Application filed October 26, 1887. Serial No. 253,453. (No specimens.)

*To all whom it may concern:*

Be it known that I, CHARLES V. MITTGE, of Brooklyn, in the county of Kings and State of New York, have invented a new and Improved Water-Proof Composition, of which the following is a full, clear, and exact description.

My invention relates to an improved composition of matter, and has for its object to provide a water-proof compound adapted to be applied to the floors and walls of buildings, to prevent the access of water and dampness, and which will also withstand extreme and varying temperatures of air, and which will be practically indestructible.

My composition consists of the following ingredients, combined in substantially the proportions stated, viz: New Zealand cement, one hundred pounds; cream of tartar, three ounces; pulverized ivory, one ounce; quicksilver, one ounce; isinglass, four ounces; marble-dust, five pounds; sand, two hundred pounds; rain-water, one pail.

In compounding the above ingredients a small quantity of cement—for instance, one pound—is mixed with the cream of tartar, quicksilver, and isinglass and water enough to make a very thin paste, and the composition is let stand for about twenty-four hours. If the weather is cold, the composition should stand in a warm place. The remainder of the cement, the pulverized ivory, marble-dust, and sand are mixed dry, and the standing compound is thereupon added, together with enough rain-water—about one-half a pail—to produce a plastic mass capable of being readily laid with a trowel or similar implement.

Instead of New Zealand cement, Portland or other cement of similar nature may be employed. If Portland cement is used, the proportions of the remaining ingredients should be increased about one-half.

After the compound is laid upon a suitable foundation—such as wood, earth, brick, or metal—it becomes very hard, equal to steel, and is capable of a very high polish, rendering it impossible for poisonous gases to lodge against its surface.

Having thus described my invention, what I claim as new, and desire to secure by Letters Patent, is—

The herein-described composition of matter to be used as a water-proof compound for the floors and walls of buildings and kindred purposes, consisting of cement, cream of tartar, pulverized ivory, quicksilver, isinglass, marble-dust, sand, and soft water, in substantially the proportions specified.

CHARLES V. MITTGE.

Witnesses:
J. F. ACKER, Jr.,
C. SEDGWICK.